United States Patent
Muraishi

(10) Patent No.: US 8,577,242 B2
(45) Date of Patent: Nov. 5, 2013

(54) IMAGE FORMING APPARATUS WITH FUSER UNIT

(75) Inventor: Norio Muraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 264 days.

(21) Appl. No.: 13/030,279

(22) Filed: Feb. 18, 2011

(65) Prior Publication Data

US 2011/0206404 A1 Aug. 25, 2011

(30) Foreign Application Priority Data

Feb. 22, 2010 (JP) ................................. 2010-036299

(51) Int. Cl.
*G03G 15/00* (2006.01)
*G03G 15/20* (2006.01)

(52) U.S. Cl.
USPC .............................. 399/88; 399/67; 399/374

(58) Field of Classification Search
USPC ........................ 399/70, 88, 364, 374
See application file for complete search history.

(56) References Cited

U.S. PATENT DOCUMENTS

| | | | |
|---|---|---|---|
| 4,928,147 A * | 5/1990 | Baumann et al. ............. | 399/337 |
| 6,243,545 B1 | 6/2001 | Jewell | |
| 6,256,464 B1 * | 7/2001 | Sumiyoshi ...................... | 399/88 |
| 7,016,624 B2 * | 3/2006 | Namura ........................... | 399/88 |
| 2005/0157319 A1 * | 7/2005 | Mizuhashi et al. ............. | 358/1.9 |
| 2005/0191078 A1 * | 9/2005 | Kishi et al. ...................... | 399/88 |
| 2006/0002730 A1 * | 1/2006 | Ohta ................................. | 399/69 |
| 2006/0182458 A1 * | 8/2006 | Hall et al. ........................ | 399/88 |
| 2007/0047989 A1 * | 3/2007 | Nakamura et al. ............. | 399/67 |
| 2007/0071479 A1 * | 3/2007 | Semma et al. ................. | 399/88 |
| 2007/0274734 A1 * | 11/2007 | Kikuchi .......................... | 399/67 |
| 2007/0280720 A1 * | 12/2007 | Kimura ........................... | 399/88 |
| 2009/0047033 A1 * | 2/2009 | Kikuchi .......................... | 399/69 |
| 2009/0086288 A1 * | 4/2009 | Sonetaka et al. ............... | 358/498 |
| 2009/0148206 A1 * | 6/2009 | Yoshikawa ..................... | 399/331 |
| 2009/0196643 A1 * | 8/2009 | Mito et al. ...................... | 399/69 |
| 2009/0263151 A1 | 10/2009 | Deguchi et al. | |

FOREIGN PATENT DOCUMENTS

| | | |
|---|---|---|
| JP | 11-069041 | 3/1999 |
| JP | 2000-174978 | 6/2000 |
| JP | 2008-015189 | 1/2008 |
| JP | 2009-111909 | 5/2009 |
| JP | 2009-265154 | 11/2009 |

OTHER PUBLICATIONS

Machine translation of JP2009-111909.*
Extended European search report dated Sep. 5, 2011.
Japanese Office Action dated Jul. 16, 2013.

* cited by examiner

*Primary Examiner* — Walter L Lindsay, Jr.
*Assistant Examiner* — David Bolduc
(74) *Attorney, Agent, or Firm* — IPUSA, PLLC

(57) ABSTRACT

An image forming apparatus includes a fuser unit configured to make an image fused to a recording medium, a selecting unit configured to select a duplex scanning mode or a single-side scanning mode, a check unit configured to determine which one of the duplex scanning mode and the single-side scanning mode is selected, a duplex scanning unit configured to perform a scan when both sides of a document sheet are scanned upon the duplex scanning mode being selected, a setting unit configured to determine power supplied to the fuser unit upon determining, by the check unit, that the single-side scanning mode is selected, and a supply unit configured to supply the determined power to the fuser unit, wherein the determined power is equal to a sum of power consumed by the duplex scanning unit and power that is consumed by the fuser unit upon the duplex scanning mode being selected.

5 Claims, 8 Drawing Sheets

FIG.5

| OPTION | CONSUMED POWER |
|---|---|
| FINISHER | $\alpha$ (W) |
| PAPER FEED TRAY | $\beta$ (W) |
| ⋮ | ⋮ |

FIG.8

| POWER SUPPLIED TO FUSER UNIT | COPY SPEED |
|---|---|
| FIRST ELECTRIC POWER X (W) | $V_1$ |
| SECOND ELECTRIC POWER Y (W) | $V_2$ |

IMAGE FORMING APPARATUS WITH FUSER UNIT

BACKGROUND OF THE INVENTION

1. Field of the Invention

The disclosures herein relate to an image forming apparatus.

2. Description of the Related Art

Image forming apparatuses provided with an ADF (i.e., auto document feeder) and/or a CIS (i.e., contact image sensor) have been used in recent years. A CIS is provided in a scanner unit, and is capable of scanning both sides of a document sheet generally at the same time. An image forming apparatus equipped with a CIS tends to consume more electric power than an image forming apparatus that scans both sides of a document sheet by reversing the sheet. This is because the CIS includes a plurality of image sensors.

Further, image forming apparatuses have been configured such that various optional units such as a paper feed tray or a finisher may be utilized. There is thus concern about an increase in power consumption due to the use of various optional units.

Japanese Patent Application Publication No. 2009-111909 discloses an image forming apparatus that achieves power saving by suspending power supply to a CIS depending on the scan mode.

An image forming apparatus includes a fuser unit. The fuser unit applies pressure or both heat and pressure to toner transferred onto a sheet, thereby causing the toner to be fused to the sheet.

The image forming apparatus disclosed in the above-noted patent publication adjusts power supply to the CIS depending on the image quality mode which is specified for a scanned image (hereinafter referred to as a "scanned-image quality mode"). Specifically, a large amount of electric power is supplied to the CIS upon determining that the scanned-image quality mode is set to a high quality mode. This is because an increased number of image sensors need to be used in the CIS in such a case. Conversely, a small amount of electric power is supplied to the CIS upon determining that the scanned-image quality mode is set to a low quality mode. This is because a decreased number of image sensors may be used in the CIS in such a case.

In the image forming apparatus disclosed in the above-noted patent publication, however, the amount of power supply to the fuser unit may be decreased when an increased number of optional units are used because these optional units consume electric power. Reduction in power supply to the fuser unit may cause a drop in the speed of image formation.

Accordingly, it may be desirable to provide an image forming apparatus that can prevent, to a maximum extent, reduction in power supply to the fuser unit even when a number of optional units used with the image forming apparatus is increased, thereby preventing a drop in the speed of image formation.

SUMMARY OF THE INVENTION

It is a general object of at least one embodiment of the present invention to provide an image forming apparatus that substantially eliminates one or more problems caused by the limitations and disadvantages of the related art.

In one embodiment, an image forming apparatus includes a fuser unit configured to make an image fused to a recording medium, a selecting unit configured to select a duplex scanning mode by which both sides of a document sheet are scanned or a single-side scanning mode by which one side of a document sheet is scanned, a check unit configured to determine which one of the duplex scanning mode and the single-side scanning mode is selected, a duplex scanning unit configured to perform a scan when both sides of a document sheet are scanned upon the duplex scanning mode being selected, a setting unit configured to determine power supplied to the fuser unit upon determining, by the check unit, that the single-side scanning mode is selected, and a supply unit configured to supply the determined power to the fuser unit, wherein the determined power is equal to a sum of power consumed by the duplex scanning unit and power that is consumed by the fuser unit upon the duplex scanning mode being selected.

According to at least one embodiment, an image forming apparatus can prevent, to a maximum extent, reduction in power supply to the fuser unit even when a number of optional units used with the image forming apparatus is increased, thereby preventing a drop in the speed of image formation.

BRIEF DESCRIPTION OF THE DRAWINGS

Other objects and further features of embodiments will be apparent from the following detailed description when read in conjunction with the accompanying drawings, in which:

FIG. 5 is a drawing illustrating an example of a table that lists electric powers consumed by various optional units used in the image forming apparatus according to the embodiment;

FIG. 8 is a drawing illustrating an example of a table that lists powers supplied to a fuser unit and respective copy speeds.

DESCRIPTION OF THE PREFERRED EMBODIMENTS

[Description of Terms]

A description of terms will be provided before providing a description of embodiments. An image forming apparatus may be a printer, a facsimile apparatus, a copier apparatus, a plotter, any combination of these, or the like. A recording medium may be paper, thread, fiber, leather, metal, plastic, glass, wood, ceramics, or the like, for example. Image formation may refer to attaching an image such as a letter, a figure, or a pattern to a recording medium, and may also refer to spurting droplets (i.e., ink droplets) to a recording medium. In the following, a description will be given with respect to an example in which a paper sheet is used as a recording medium, printing used as image formation, and a CIS used as a duplex scanning unit. Further, an ADF refers to an auto document feeder. A document sheet refers to a sheet that is set by a user in the ADF or the like for scanning by a single-side scanner unit or CIS. One or more images scanned from the document sheet are formed on and fused to a sheet. Elements having the same function in block diagrams or processes performing the same processing are referred to by the same reference numbers, and a duplicate description thereof will be omitted.

[Overall Description of Image Forming Apparatus]

Figure 1:
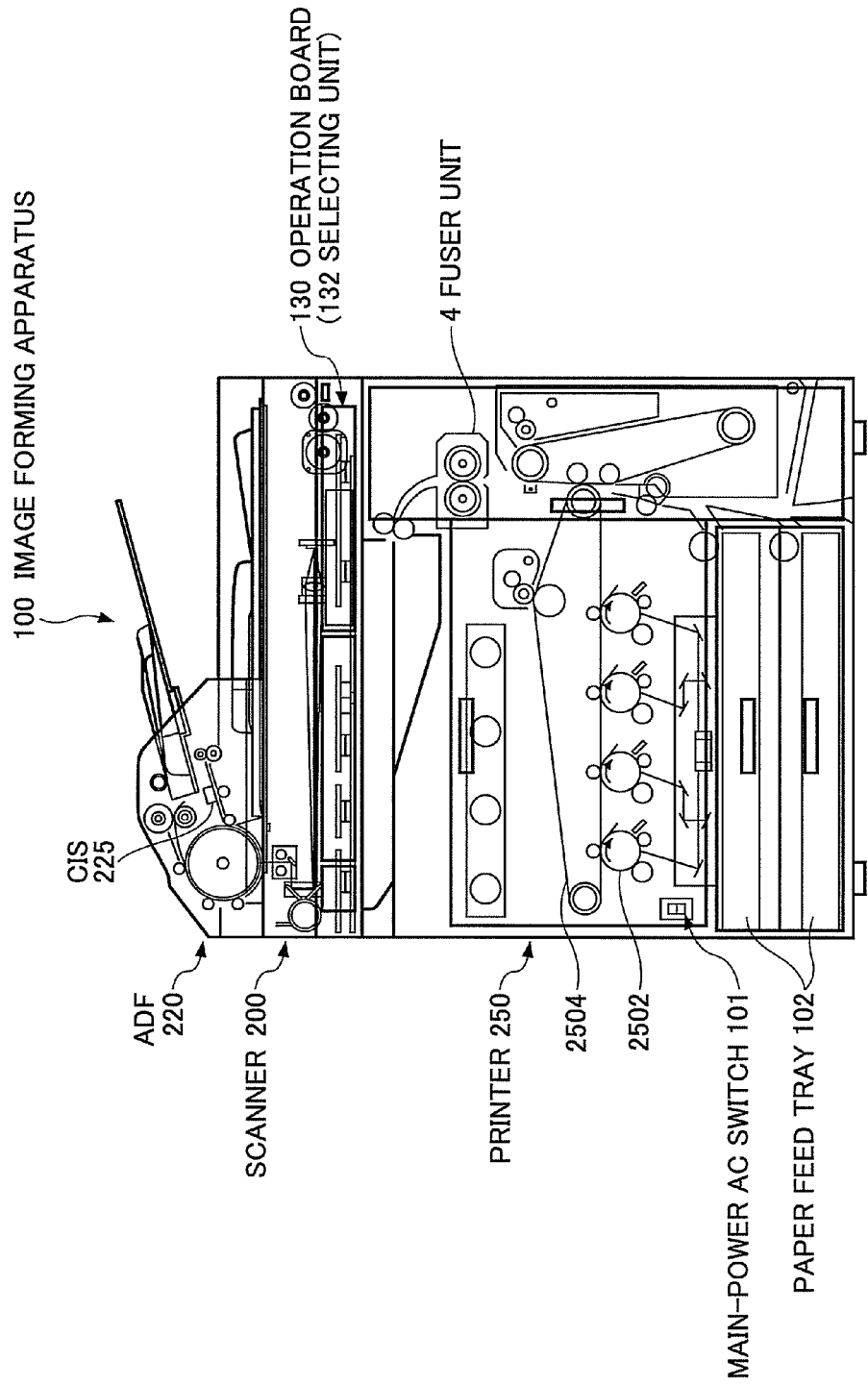
FIG. 1 is a drawing illustrating the entirety of an image forming apparatus according to an embodiment.

FIG. 1 is a drawing showing an example of the configuration of an image forming apparatus 100 according to a present embodiment. The image forming apparatus 100 of the present embodiment is equipped with an ADF 220 and a CIS 225. The image forming apparatus 100 illustrated in FIG. 1 mainly includes the ADF 220, an operation board 130, a scanner 200, and a printer 250. The scanner 200 serves as a single-side scanning unit. The duplex scanning unit serves to scan both sides of a document sheet whereas the single-side scanning unit scans one side of a document sheet.

A user turns on a main-power AC switch 101 to supply electric power to each part of the image forming apparatus 100, thereby activating the image forming apparatus 100. A paper feed tray 102 contains paper sheets provided by the user. The paper sheets in the paper feed tray 102 are supplied to a core part of the image forming apparatus 100 at the time of printing for the purpose of image formation. Upon installing the paper feed tray 102, which is an optional unit, electric power needs to be supplied to the paper feed tray 102.

In this example, the printer 250 includes a plurality of photoconductive drums 2502 (four drums in the example illustrated in FIG. 1) and an intermediate transfer belt 2504. The printer 250 transfers a toner image onto a paper sheet supplied from the paper feed tray 102. The paper sheet is then supplied to the fuser unit 4. At this point in time, the toner image transferred onto the paper sheet is not yet fused. The fuser unit 4 utilizes pressure and/or heat to fuse the toner image transferred onto the paper sheet, thereby turning the toner image into a permanent image. The paper sheet having the toner image fused thereon by the fuser unit 4 is discharged by a discharge unit.

A user may wish to perform booklet printing. In such a case, the user operates the operation board 130 to enter an instruction indicative of booklet printing. In response, discharged paper sheets are stapled together by a finisher (not shown). Upon installing the finisher, which is an optional unit, electric power needs to be supplied to the finisher.

The ADF 220 serves to feed a document sheet automatically upon a plurality of document sheets being set thereon. As previously described, the CIS 225 is comprised of a plurality of image sensors. When the document sheet is a double-sided document, the CIS 225 scans both sides of the document sheet substantially in a simultaneous manner. The scanner 200 serves as a single-side scanning unit. A user uses the selecting unit 132 of the operation board 130 to select whether a document sheet to be copied is a single-sided document or double-sided document. When the information entered by the user indicates a double-sided document, the CIS 225 scans both sides of the document. When the information entered by the user indicates a single-sided document, the single-side scanning unit 200 scans one side of the document.

The scanner 200 includes a control board having power device drivers, sensor inputs, and a controller. Through communication with an engine controller, the scanner 200 is controlled to scan an image on the front side of a document sheet.

The ADF 220 also includes a control board having power device drivers, sensor inputs, a CIS for scanning the back side of a document sheet, and a controller. Through communication with the engine controller, the scanner 200 is controlled to scan an image on the back side of the document sheet.

In this manner, the scanner 200 and the ADF 220 inclusive of the CIS 225 are utilized to scan both the front side and back side of a document sheet by feeding the document sheet only once.

Figure 2:
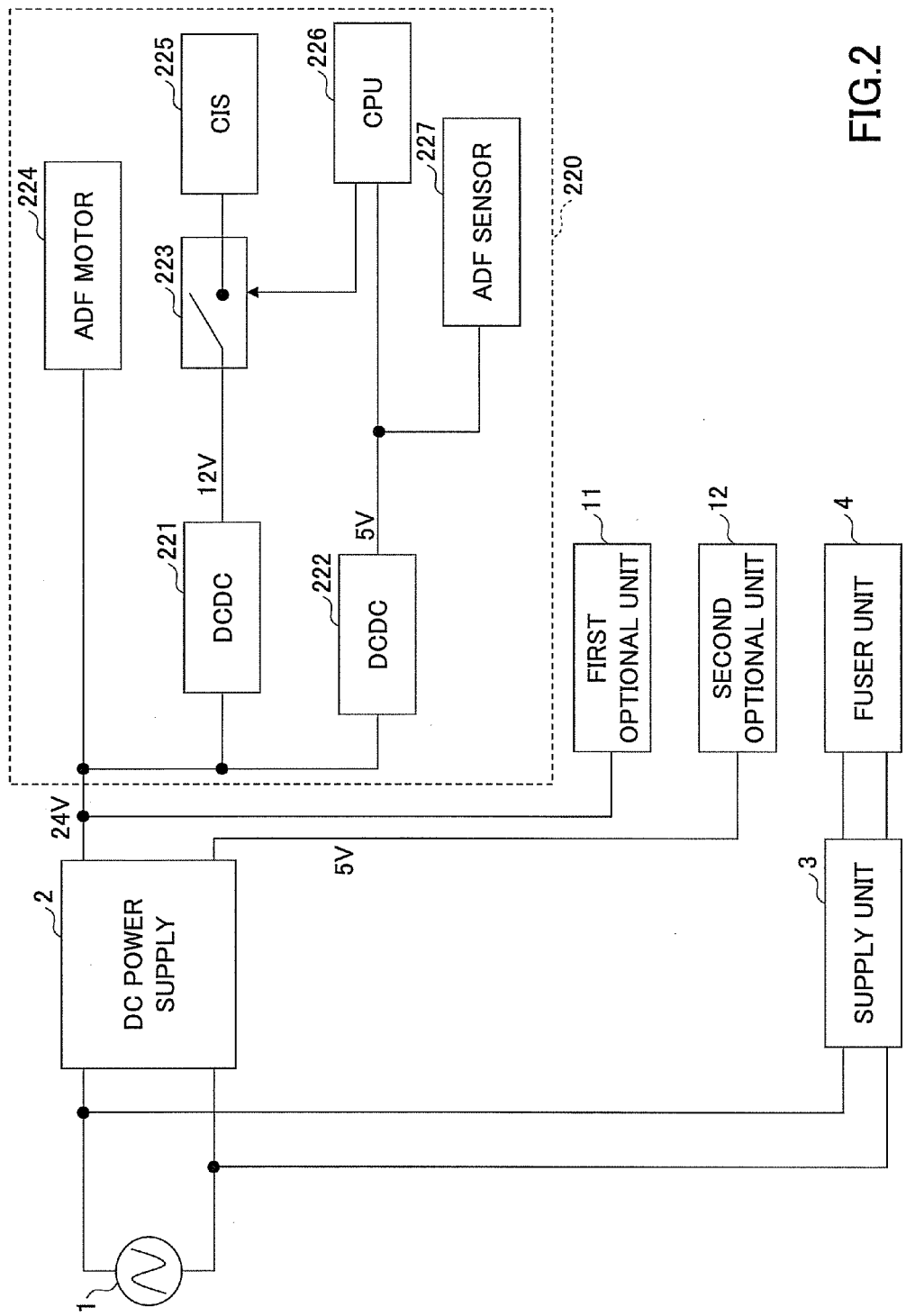
FIG. 2 is a drawing illustrating the electric circuitry of the image forming apparatus according to the embodiment.

FIG. 2 is a drawing showing a power circuitry configuration of the image forming apparatus 100. The image forming apparatus illustrated in FIG. 2 includes an AC power supply 1, a DC power supply 2, a supply unit 3, the fuser unit 4, the ADF 220, a first optional unit 11, and a second optional unit 12.

The ADF 220 includes DCDC converters 221 and 222, an ADF motor 224, a switch unit 223, the CIS 225, a CPU 226, and a sensor 227 embedded in the ADF 220.

A description will be given of terms appearing in FIG. 2. The DC power supply 2 converts AC power supplied from the AC power supply 1 into DC power, which is supplied to relevant parts. The first optional unit 11 and the second optional unit 12 may be the DC power supply 2 (see FIG. 1) and the finisher (not shown), respectively, for example. Optional units are not limited to these examples. In FIG. 2, the first optional unit 11 and the second optional unit 12 are illustrated as separate units, but may instead be illustrated as a single unit. In the following, all the optional units provided for the image forming apparatus will be collectively referred to as an optional configuration. Further, the fuser unit 4 may be referred to as a primary load, and the optional configuration may be collectively referred to as a secondary load. It may be noted that the supply unit 3 serves to adjust the amount of electric power supplied to the fuser unit 4.

The ADF motor 224 serves to drive the ADF 220. Other motors are also used in reality. In FIG. 2, however, only the ADF motor 224 is illustrated for the sake of simplicity of illustration. The ADF sensor 227 is used for the purpose of ensuring proper operations of the ADF 220. For example, the ADF sensor 227 may check whether a document sheet is placed on the ADF 220.

In the following, the flow of electric power will be described. Upon the main-power AC switch 101 (FIG. 1) being turned on by a user, AC power is supplied from the AC power supply 1 to the DC power supply 2. The DC power supply 2 converts the supplied AC power into DC power. AC power from the AC power supply 1 is also supplied to the supply unit 3. The supply unit 3 adjusts the amount of AC power that is supplied to the fuser unit 4.

The DC powers output from the DC power supply 2 include 24-V power and 5-V power. The 24-V DC power is supplied to the ADF motor 224 and the DCDC converters 221 and 222. Upon receiving the 24-V DC power, the ADF motor 224 drives the ADF 220. In the example illustrated in FIG. 2, the DCDC converter 221 generates 12-V DC power from the supplied 24-V DC power for provision to the CIS 225 via the switch unit 223.

The switch unit 223 is turned on or turned off according to a control signal from the CPU 226. Upon the switch unit 223 being turned on, the DC power output from the DCDC converter 221 is supplied to the CIS 225. Conversely, upon the switch unit 222 being turned off, the DC power output from the DCDC converter 221 is not supplied to the CIS 225.

Further, the DCDC converter 222 generates 5-V DC power from the supplied 24-V DC power for provision to the CPU 226 and the ADF sensor 227. The CPU 226 and the ADF sensor 227 operate on the supplied 5-V DC power.

Figure 3:
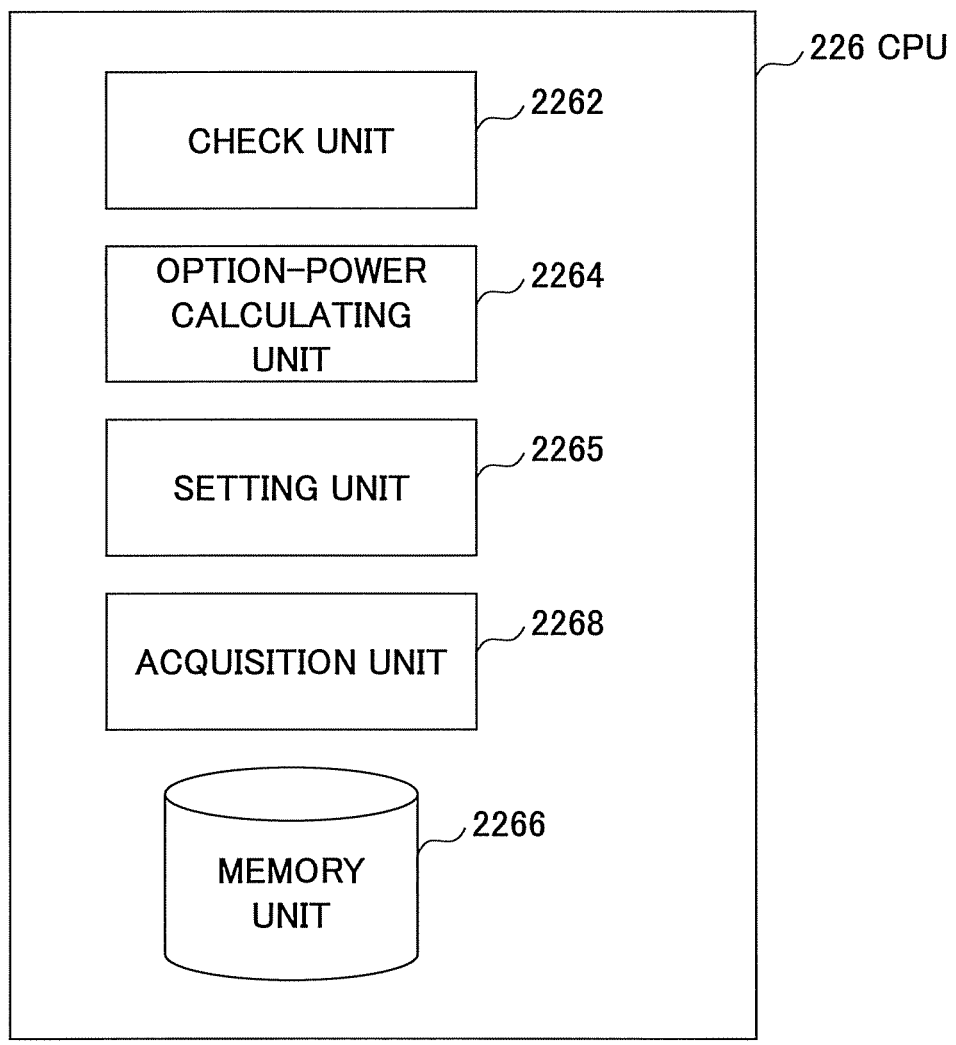
FIG. 3 is a drawing illustrating an example of the functional configuration of a CPU used in the image forming apparatus according to the embodiment.

FIG. 3 is a drawing showing an example of the functional configuration of the CPU 226 according to the present embodiment. The CPU 226 includes a check unit 2262, an option-power calculating unit 2264, a setting unit 2265, an acquisition unit 2268, and a memory unit 2266. Details of operations of these units will be described later.

[Transition to Standby Mode]

Figure 4:
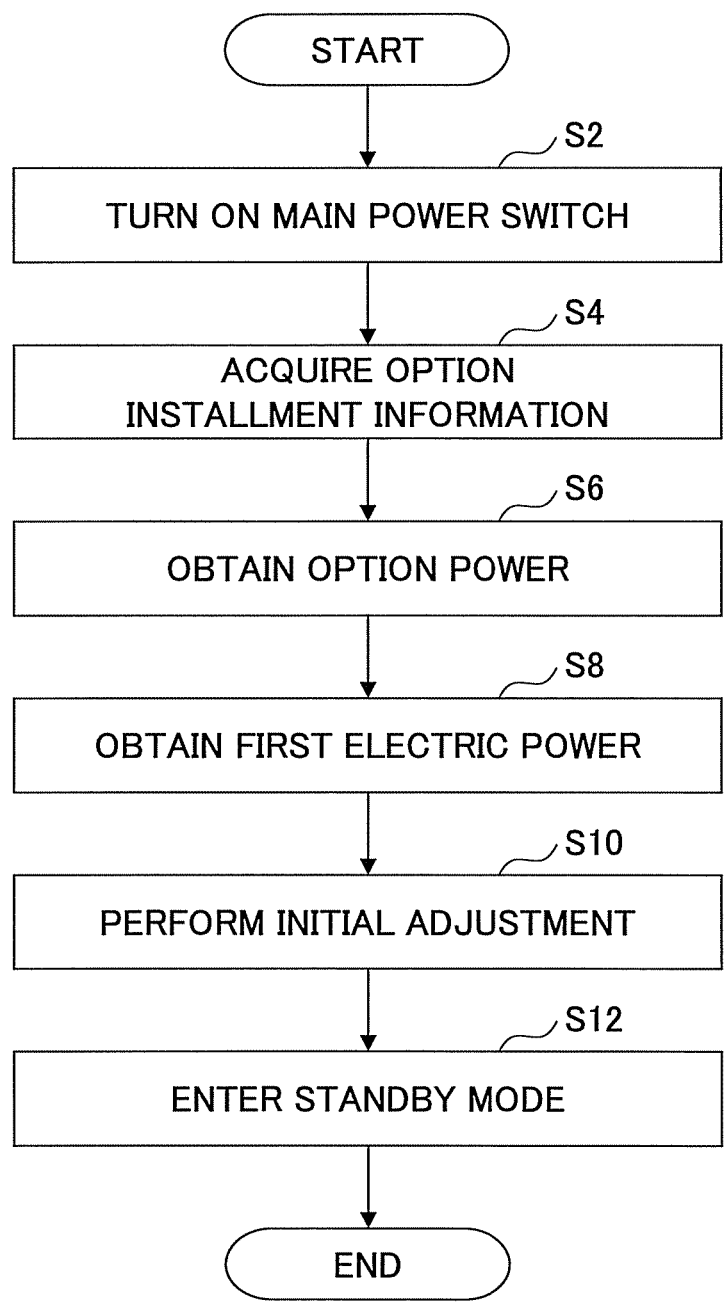
FIG. 4 is a flowchart illustrating a procedure that is performed before the image forming apparatus enters a standby mode.

In the following, a description will be given of a procedure according to which the image forming apparatus 100 enters a standby mode upon the main-power AC switch 101 being turned on by a user. The standby mode refers to a mode in which the image forming apparatus 100 waits for an operation input to be entered by a user. FIG. 4 is a flowchart illustrating a procedure that is performed to enter a standby mode. A user turns on the main-power AC switch 101 (see FIG. 1) (step S2). In response, the acquisition unit 2268 acquires option installment information (step S4). The option installment information indicates the optional configuration provided for the image forming apparatus 100. For example, the optional configuration may be a finisher and a paper feed tray. In such a case, the option installment information indicates that the optional configuration of the image forming apparatus 100 is comprised of the finisher and the paper feed tray.

The option-power calculating unit 2264 calculates option power based on the option installment information (step S6). Here, the option power refers to the total power that is consumed by all the optional configuration. The memory unit 2266 stores a correspondence table in which optional units are listed in one-to-one correspondence to consumed powers. FIG. 5 is a drawing illustrating an example of the table. In FIG. 5, a finisher consumes an electric power of $\alpha W$, and a paper feed tray consumes an electric power of $\beta(W)$. Consumed powers of the optional units indicated by the option installment information are obtained and all added to obtain the option power. For example, the optional configuration may be a finisher and a paper feed tray. In this case, the option power is equal to $\alpha+\beta$.

The setting unit 2265 then obtains first electric power consumed by the fuser unit 4 (step S8). The first electric power is the power consumed by the fuser unit 4 when the CIS 225 is used. There are various ways to obtain the first electric power. One way to obtain the power is to use the following formula.

$$\text{First Electric Power} = \text{Power Supplied to Image Forming Apparatus} - \text{Option Power} - \text{Constant } \gamma \quad (1)$$

Here, the power supplied to the image forming apparatus appearing in above-noted formula (1) may be determined in advance. The option power is obtained by the option-power calculating unit 2264 as was previously described. The constant $\gamma$ is the electric power consumed by parts other than the optional configuration, and may be the electric power used for image forming processes. The constant $\gamma$ is determined in advance, and may be stored in the memory unit 2266. The constant $\gamma$ may be set to zero. The obtained first electric power may be stored in the memory unit 2266.

An initial adjustment process of the image forming apparatus 100 inclusive of a warming up of the fuser unit 4 is performed (step S10). After the completion of the initial adjustment process, an entry into the standby mode is made to allow a user operation (step S12).

[Commencement of Image Forming Process]

In the following, a procedure performed at the time of starting an image forming process (i.e., printing process) will be described. A user uses the selecting unit 132 of the operation board 130 (see FIG. 1) to select a scan mode (step S13). The scan mode may be a duplex scanning mode by which both sides of a document sheet are scanned, or may be a single-side scanning mode by which one side of a document sheet is scanned. In addition to the scan mode, a copy mode is also specified by selecting whether to make a high quality copy or a low quality copy, whether to make a monochrome copy or a color copy, etc. Information about the scan mode and the copy mode is sent to the CPU.

The user presses a copy start button to start a copy process (step S14). The copy start button may be provided on the operation board 130. The check unit 2262 of the CPU 226 (see FIG. 3) checks which one of the duplex scanning mode and the single-side scanning mode is selected (step S16). In the case of the duplex scanning mode, the CIS 225 (see FIG. 1) is used to scan both sides of a document sheet. In the case of the single-side scanning mode, the single-side scanning sensor 200 (see FIG. 1) is used to scan one side of a document sheet. In the present embodiment, the duplex scanning sensor is the CIS 225. Alternatively, another means may be employed as the duplex scanning sensor.

<Single-Side Scanning Mode>

In the following, a description will be given of a case in which the check unit 2262 determines that the single-side scanning mode is selected (i.e., the case in which the CIS 225 is not used, corresponding to No in step S16). In this case, the setting unit 2265 of the CPU 226 makes a setting (step S18) such that a second electric power is supplied to the fuser unit 4. The second electric power is the power consumed by the fuser unit 4 when the CIS 225 is not used. The second electric power is obtained by use of formula (2) as follows.

$$\text{Second Electric Power} = \text{First Electric Power} + \text{Electric Power Consumed by } CIS \quad (2)$$

Formula (2) given above will be described below. Formula (2) indicates that the second electric power is obtained by adding the electric power (i.e., first electric power) consumed by the fuser unit 4 in the case of the duplex scanning unit (i.e., CIS 225) being used and the electric power consumed by the duplex scanning unit (i.e., CIS 225). In the image forming apparatus of the present embodiment, electric power is not supplied to the CIS 225 when the CIS 225 is not used, so that the electric power that would be consumed by the CIS 225 in the case of the CIS 225 being used is provided to the fuser unit 4. The setting unit 2265 may calculate the above-noted formula (2) each time the printing process is performed in the case of the single-side scanning mode. The second electric power calculated by the setting unit 2265 is stored in the memory unit 2266 (i.e., the setting is made).

The second electric power may be calculated in advance by the setting unit 2265 according to formula (2) and stored in the memory unit 2266. In this case, the setting unit 2265 does not calculate formula (2) each time the printing process is performed, and uses the second electric power already stored in the memory unit 2266. In the following, the second electric power set by the setting unit 2265 may be referred to as a set power.

The CIS 225 turns off the switch unit 223 to suspend the power supply to the CIS (step S20).

<Duplex Scanning Mode>

In the following, a description will be given of a case in which the check unit 2262 determines that the duplex scanning mode is selected (i.e., the case in which the CIS 225 is used, corresponding to Yes in step S16). In such a case, the setting unit 2265 makes a setting (step S22) such that the first electric power calculated in step S8 of the flowchart of FIG. 4 as previously described is used. As previously described, the first electric power is the power consumed by the fuser unit 4 when the CIS 225 is used.

The CPU 226 supplies the set power to the fuser unit 4 (step S24). If it is ascertained in step S16 by the check unit 2262 that the duplex scanning mode is selected (i.e., Yes in step S16), the first electric power is supplied to the fuser unit 4. If it is ascertained in step S16 by the check unit 2262 that the single-side scanning mode is selected (i.e., No in step S16), the second electric power is supplied to the fuser unit 4. Switching between the first electric power and the second electric power is controlled by the supply unit 3 under the control of the CPU 226.

Upon supplying the first electric power or second electric power to the fuser unit 4, the image forming apparatus 100 performs an image forming process (step S26).

[Completion of Image Forming Process]

Figure 7:
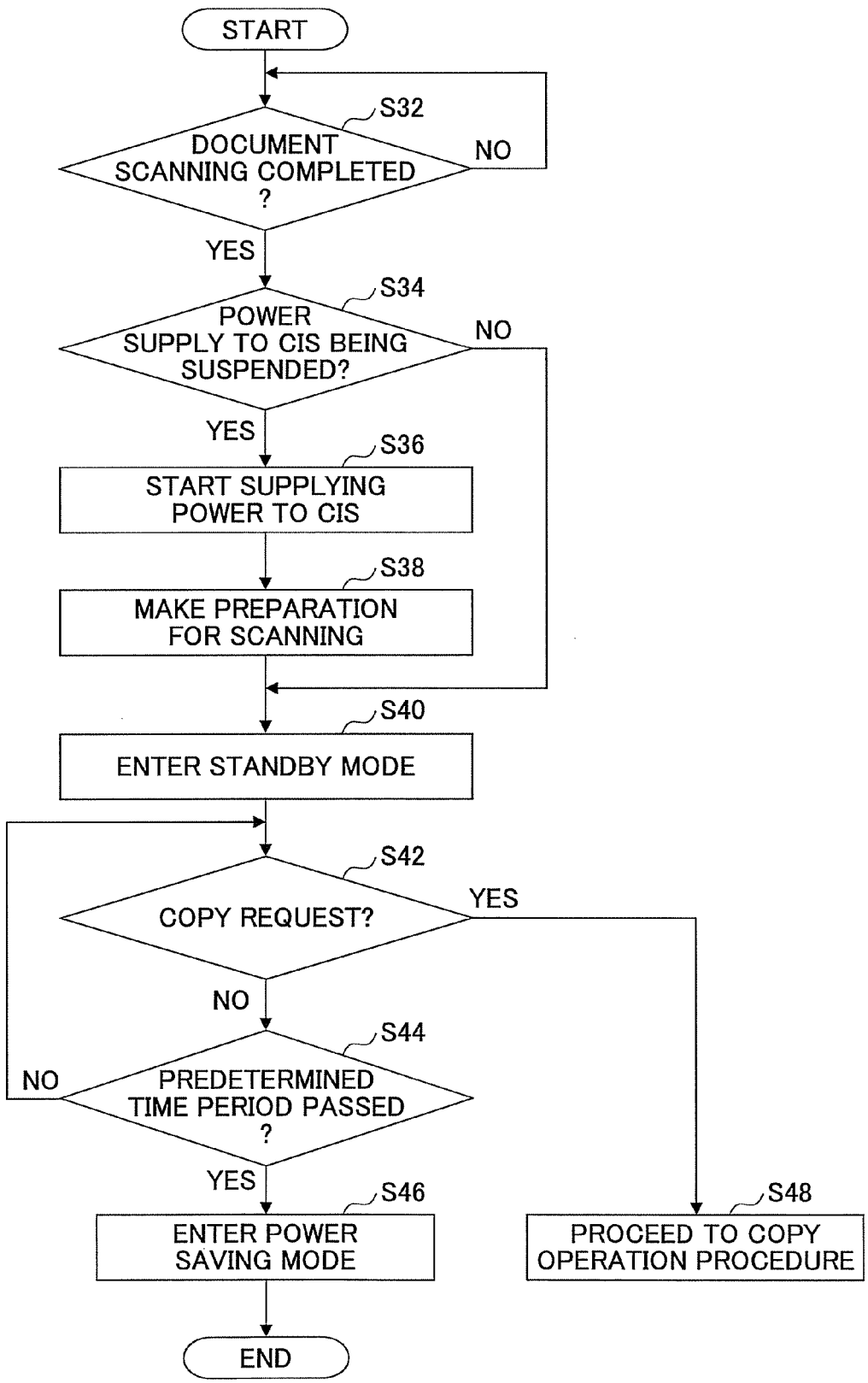
FIG. 7 is a flowchart illustrating a procedure performed at the completion of an image forming process according to the embodiment.

In the following, a procedure performed at the completion of an image forming process will be described. FIG. 7 is a flowchart illustrating a procedure performed at the completion of an image forming process. The CPU 226 checks whether a document scanning process is completed (step S32). Upon detecting an ongoing scanning process, the CPU 226 waits for the scanning process to come to an end (No in step S32). Upon detecting the completion of the document scanning process by the CPU 226 (Yes in step S32), the procedure proceeds to step S34. The CPU 226 then checks whether the power supply to the CIS 225 is in a suspended state. The fact that the power supply to the CIS 225 is in a suspended state corresponds to the case in which the check unit 2262 has decided not to use the CIS 225.

In the case of the power supply to the CIS 225 being in a suspended state (Yes in step S34), the CPU 226 turns on the switch unit 223 to start power supply to the CIS 225 (step S36). Namely, the supply unit 3 starts supplying electric power to the duplex scanning unit (i.e., CIS 225) after the completion of the image forming process that is performed without using the duplex scanning unit. With this arrangement, a delay of printing is avoided in a next printing process. When the power supply to the CIS 225 is in a suspended state, a delay upon restarting power supply to the CIS 225 may be caused by a time to wait for the stabilization of power supply and/or a time to make settings for the use of the CIS 225 before starting scanning a document sheet.

Upon starting power supply to the CIS 225, preparations for scanning a document sheet are made (step S38). Then, an entry into the standby mode is made (step S40). As previously described, the standby mode refers to a mode in which the image forming apparatus waits for an operation input to be entered by a user.

In the case of the power supply to the CIS 225 being not in a suspended state (No in step S34), i.e., in the case of the CIS 225 having been used (for the duplex scanning process), the power supply to the CIS 225 is in existence, and preparations for scanning are also in place. In this case, the procedure proceeds directly to step S40, without going through step S36 and step S38.

Figure 6:
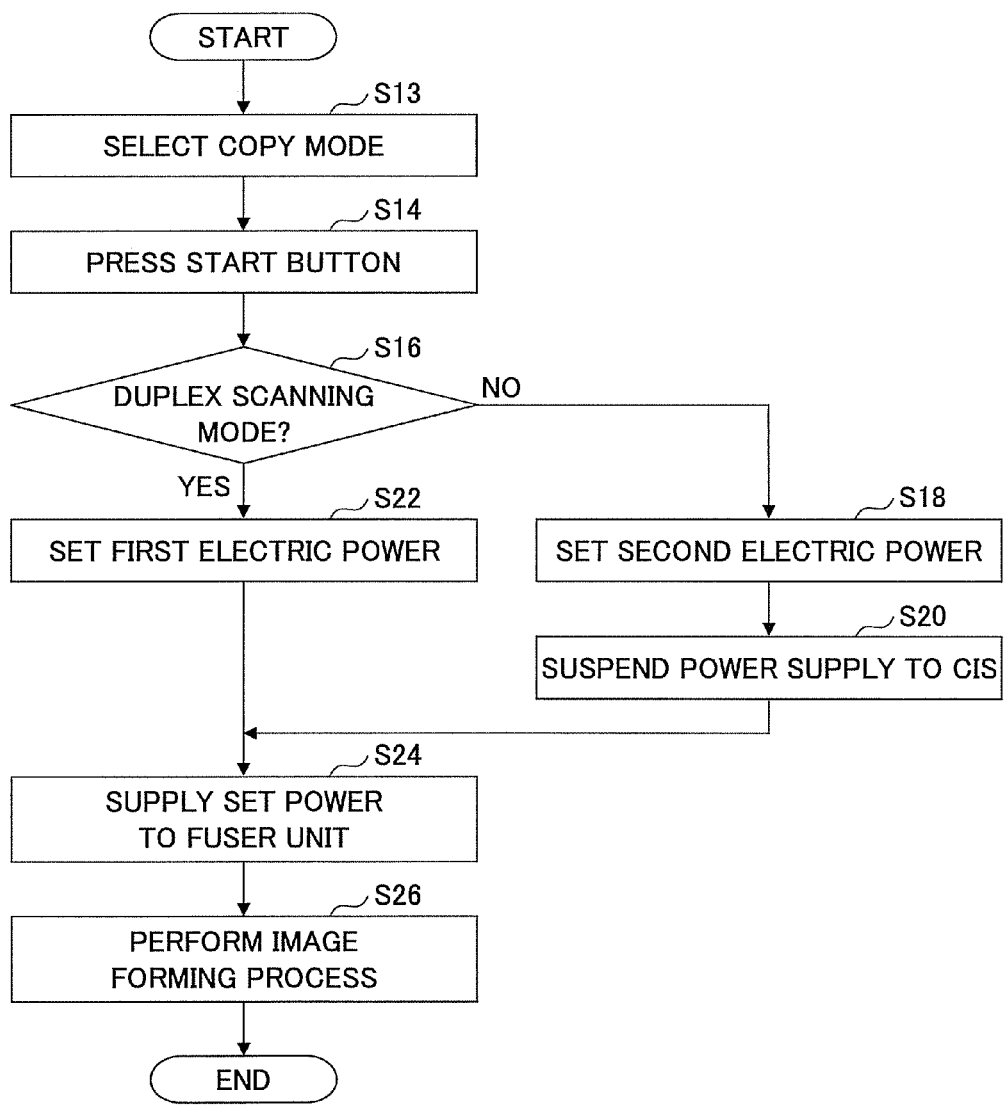
FIG. 6 is a flowchart illustrating an image forming process according to the embodiment.

Upon completing the process of step S40, the CPU 226 checks whether a copy request from a user is present (step S42). In the case of a user copy request being present, a procedure for the commencement of a copy process (see FIG. 6) is performed.

In the case of a copy request being absent, the procedure proceeds to step S44. In step S44, the CPU 226 checks whether a predetermined time period has passed. The CPU 226 may use a timer for measuring the predetermined time period. The image forming apparatus 100 waits until the predetermined time period passes (No in step S44). Upon the passage of the predetermined time period (Yes in step S44), an entry into a power saving mode is made (step S46).

In the present embodiment, the CIS 225 (i.e., duplex scanning unit) is not used when a single-side scanning mode is selected. In the case of the CIS 225 being not used, there is no need to supply electric power to the CIS 225. In the case of the single-side scanning mode, the supply unit 3 supplies the second electric power to the fuser unit 4 that is obtained by adding the first electric power and the electric power that would be consumed by the CIS 225 in the case of the CIS 225 being used. The second electric power is larger than the first electric power. With this configuration, even when a lot of optional configuration is used, a reduction in the power supply to the fuser unit 4 can be suppressed to a necessary minimum amount. Accordingly, a drop in the speed of copying is also suppressed to a minimum.

[Variation]

In the above-described embodiment, the electric power supplied to the fuser unit differs depending on whether the scanning mode is the duplex scanning mode or the single-side scanning mode. In a variation of the above-noted embodiment, a copy speed of the duplex scanning mode and/or a copy speed of the single-side scanning mode (e.g., in units of CPM: copies per minute) is displayed. A display unit of the image forming apparatus may be used for this purpose. Such a display unit may be situated on the operation board 130 (see FIG. 1).

Copy speed may be calculated based on the electric power supplied to the fuser unit 4 (i.e., the first electric power or the second electric power). There are various ways to calculate copy speed. For example, a predetermined formula or a correspondence table may be used. FIG. 8 is a drawing illustrating an example of the correspondence table. In the example illustrated in FIG. 8, copy speed is $V_1$ when the power supply to the fuser unit 4 is the first electric power (i.e., X(W)), and copy speed is $V_2$ when the power supply to the fuser unit 4 is the second electric power (i.e., Y(W)). The CPU 226 may refer to this correspondence table to determine copy speed. The predetermined formula or correspondence table may be obtained in advance based on experiments.

In this variation, the display unit displays an image forming speed achieved in the case of a duplex scanning mode and/or an image forming speed achieved in the case of a single-side scanning mode. This allows a user to be aware of copy speeds.

Further, the present invention is not limited to these embodiments, but various variations and modifications may be made without departing from the scope of the present invention.

The present application is based on Japanese priority application No. 2010-036299 filed on Feb. 22, 2010, with the Japanese Patent Office, the entire contents of which are hereby incorporated by reference.

The invention claimed is:

1. An image forming apparatus, comprising:
    a fuser unit configured to make an image fused to a recording medium;
    a selecting unit configured to select a duplex scanning mode by which both sides of a document sheet are scanned or a single-side scanning mode by which one side of a document sheet is scanned;
    a check unit configured to determine which one of the duplex scanning mode and the single-side scanning mode is selected;
    a duplex scanning unit configured to perform a scan when both sides of a document sheet are scanned upon the duplex scanning mode being selected;

a setting unit configured to determine power supplied to the fuser unit upon determining, by the check unit, that the single-side scanning mode is selected; and a supply unit configured to supply the determined power to the fuser unit, wherein the determined power is equal to a sum of power consumed by the duplex scanning unit and power that is consumed by the fuser unit upon the duplex scanning mode being selected, and wherein the supply unit is configured to change the power supplied to the fuser unit according to which one of the single-side scanning mode and the duplex scanning mode is selected.

2. The image forming apparatus as claimed in claim 1, wherein the supply unit starts supplying power to the duplex scanning unit upon completion of an image forming process that is performed in the single-side scanning mode.

3. The image forming apparatus as claimed in claim 1, further comprising a display unit configured to display at least one of an image forming speed achieved in the duplex scanning mode and an image forming speed achieved in the single-side scanning mode.

4. An image forming apparatus, comprising:

a fuser unit configured to make an image fused to a recording medium;

a selecting unit configured to select a duplex scanning mode by which both sides of a document sheet are scanned or a single-side scanning mode by which one side of a document sheet is scanned;

a duplex scanning unit configured to perform a scan upon the duplex scanning mode being selected and not to perform a scan upon the single-sided scanning mode being selected; and a supply unit configured to supply first power to the fuser unit upon the duplex scanning mode being selected and to supply second power to the fuser unit upon the single-side scanning mode being selected, wherein the second power is equal to a sum of the first power and power consumed by the duplex scanning unit, and wherein the supply unit is configured to change a power supplied to the fuser unit according to which one of the single-side scanning mode and the duplex scanning mode is selected.

5. The image forming apparatus as claimed in claim 2, wherein the supply unit starts supplying the power to the duplex scanning unit after the completion of the image forming process in the single-side scanning mode and before the image forming apparatus enters standby mode.

* * * * *